(12) United States Patent
Tsunoda

(10) Patent No.: US 7,258,944 B2
(45) Date of Patent: Aug. 21, 2007

(54) FUEL CELL WITH IMPROVED SEPARATORS AND CIRCULAR DISK-SHAPED ELECTROLYTE ELECTRODE ASSEMBLIES

(75) Inventor: Tadashi Tsunoda, Tokyo (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 425 days.

(21) Appl. No.: 10/608,581

(22) Filed: Jun. 27, 2003

(65) Prior Publication Data

US 2004/0053107 A1    Mar. 18, 2004

(30) Foreign Application Priority Data

Jun. 28, 2002    (JP)    ............... 2002-190047

(51) Int. Cl.
  *H01M 2/14*    (2006.01)
  *H01M 8/04*    (2006.01)
(52) U.S. Cl. .......................................... 429/39; 429/38
(58) Field of Classification Search .................. 429/38, 429/39, 34
  See application file for complete search history.

(56) References Cited

U.S. PATENT DOCUMENTS

| | | | |
|---|---|---|---|
| 4,708,916 A | 11/1987 | Ogawa et al. | |
| 4,983,472 A * | 1/1991 | Katz et al. | ..................... 429/38 |
| 6,432,567 B1 | 8/2002 | Doggwiler et al. | |
| 2002/0146601 A1 * | 10/2002 | Sugiura et al. | ................ 429/13 |
| 2003/0072989 A1 | 4/2003 | Lee et al. | |

FOREIGN PATENT DOCUMENTS

| | | | |
|---|---|---|---|
| EP | 0357025 A1 | | 3/1990 |
| EP | 0357025 A1 * | | 3/1990 |
| EP | 1 037 296 A1 | | 9/2000 |
| EP | 001075033 A1 * | | 2/2001 |
| JP | 11-016581 A | | 1/1999 |
| WO | WO99/57777 A1 | | 11/1999 |

OTHER PUBLICATIONS

Australian Office Action for Application No. 2003238160, dated Mar. 6, 2006.

* cited by examiner

*Primary Examiner*—Susy Tsang-Foster
*Assistant Examiner*—Tony Chuo
(74) *Attorney, Agent, or Firm*—Lahive & Cockfield, LLP; Anthony A. Laurentano, Esq.

(57) ABSTRACT

A fuel cell includes separators and electrolyte electrode assemblies in a first area between the separators. Each separator includes a first plate and a second plate stacked together to form a second area between the first plate and the second plate. The second area is divided by an outer ridge into a fuel gas channel, and an oxygen-containing gas channel. The fuel gas channel formed in one separator is connected to a fuel gas flow passage in the first area through fuel gas inlets for supplying a fuel gas to anodes. The oxygen-containing gas channel in the other separators is connected to an oxygen-containing gas flow passage in the first area through oxygen-containing gas inlets for supplying an oxygen-containing gas to cathodes.

9 Claims, 11 Drawing Sheets

← OXYGEN-CONTAINING GAS
← FUEL GAS

← FUEL GAS

FUEL CELL WITH IMPROVED SEPARATORS AND CIRCULAR DISK-SHAPED ELECTROLYTE ELECTRODE ASSEMBLIES

BACKGROUND OF THE INVENTION

1. Field of the Invention

The present invention relates to a fuel cell having circular disk-shaped electrolyte electrode assemblies interposed between disk-shaped separators. Each of the electrolyte electrode assemblies includes an anode, a cathode, and an electrolyte interposed between the anode and the cathode.

2. Description of the Related Art

Typically, a solid oxide fuel cell (SOFC) employs an electrolyte of ion-conductive solid oxide such as stabilized zirconia. The electrolyte is interposed between an anode and a cathode to form an electrolyte electrode assembly. The electrolyte electrode assembly is interposed between separators (bipolar plates), and the electrolyte electrode assembly and the separators make up a unit of fuel cell for generating electricity. A predetermined number of fuel cells are stacked together to form a fuel cell stack.

In the fuel cell, an oxygen-containing gas or air is supplied to the cathode. The oxygen in the oxygen-containing gas is ionized at the interface between the anode and the electrolyte, and the oxygen ions ($O^{2-}$) move toward the anode through the electrolyte. A fuel gas such as hydrogen-containing gas or CO is supplied to the anode. The oxygen ions react with the hydrogen in the hydrogen-containing gas to produce $H_2O$ or react with CO to produce $CO_2$. Electrons released in the reaction flow through an external circuit to the cathode, creating a DC electric current.

Generally, the solid oxide fuel cell is operated at a high temperature in the range from 800° C. to 1000° C. The solid oxide fuel cell utilizes the high temperature waste heat for internal reforming to produce the fuel gas, and for spinning a gas turbine to generate electricity. The solid oxide fuel cell is attractive as it has the highest efficiency in generating electricity in comparison with other types of fuel cells, and receiving growing attention for potential use in vehicles in addition to the applications in combination with the gas turbine.

Typically, a sealing member such as a glass ring is inserted between the membrane electrode assembly and separators for preventing leakage of the fuel gas and the oxygen-containing gas supplied to the anode and the cathode of the membrane electrode assembly. Therefore, the fuel cell has a complicated structure, and the overall dimension of the fuel cell stack formed by stacking a plurality of the fuel cell is large in the stacking direction. In particular, in the solid oxide fuel cell operated at a high temperature, the sealing member is likely to be damaged by heat, and the desired sealing performance may not be maintained reliably.

In an attempt to address the problem, for example, Japanese Laid-Open Patent Publication No. 11-16581 discloses a solid oxide fuel cell. Specifically, as shown in FIG. 11, the cell includes a separator 1 having opposite main surfaces 2a, 2b. A plurality of ribs 3a are provided radially on the main surface 2a, and a plurality of ribs 3b are provided radially on the main surface 2b. Grooves 4a, 4b extend from the outside to central regions on the main surfaces 2a, 2b of the separator 1, respectively. The groove 4a has a predetermined depth to place a fuel gas supply pipe 5 in the groove 4a, and the groove 4b has a predetermined depth to place an oxygen-containing gas supply pipe 6 in the groove 4b. The fuel gas supply pipe 5 and the oxygen-containing gas supply pipe 6 are almost received inside the grooves 4a, 4b of the separator 1. Each of the fuel gas supply pipe 5 and the oxygen-containing gas supply pipe 6 has a planar shape having a thin end portion.

In the fuel cell, the fuel gas supplied to the fuel gas supply pipe 5 flows toward the central region on the main surface 2a of the separator 1, and the oxygen-containing gas supplied to the oxygen-containing gas pipe 6 flows toward the central region on the main surface 2b of the separator 1. The fuel gas is supplied to an electrolyte electrode assembly (not shown) on the side of the main surface 2a, and flows outwardly from a central region of the electrolyte electrode assembly. The oxygen-containing gas is supplied to another electrolyte electrode assembly (not shown) on the side of main surface 2b, and flows outwardly from a central region of the other electrolyte electrode assembly (not shown).

In the prior art, the grooves 4a, 4b each having a predetermined depth extend from the outside to central regions on the surfaces 2a, 2b of the separator 1, respectively, for placing the fuel gas supply pipe 5 in the groove 4a, and placing the oxygen-containing gas supply pipe 6 in the groove 4b. Thus, the separator 1 is likely to be deformed or damaged due to heat stress or the like. The chemical reaction in the electrolyte electrode assemblies may not be performed uniformly due to the presence of the fuel gas supply pipe 5 and the oxygen-containing gas supply pipe 6. Further, when many cells are stacked to form the fuel cell stack, the dimension of the fuel cell stack in the stacking direction is large due to the thickness of the fuel gas supply pipe 5 and the oxygen-containing gas supply pipe 6.

SUMMARY OF THE INVENTION

A general object of the present invention is to provide a compact and simple fuel cell having a simple sealing structure, and having a capability of dividing a fuel gas and an oxygen-containing gas without any supply pipes, while maintaining the desired power generation performance.

According to the present invention, a first area for providing electrolyte electrode assemblies is formed between a pair of separators. Each of the separators includes a first plate and a second plate stacked together to form a second area between the first plate and the second plate. The second area is divided by a partition into a fuel gas channel for supplying a fuel gas to anodes of the electrolyte electrode assemblies, and oxygen-containing gas channel for supplying an oxygen-containing gas to cathodes of the electrolyte electrode assemblies.

In the separator, the fuel gas channel and the oxygen-containing gas channel are sealed by the partition. Thus, no special sealing members are required. The separator is simple and light. The dimension of the fuel cell in the stacking direction is small.

The fuel gas channel is connected to fuel gas inlets for supplying the fuel gas to the anodes of the electrolyte electrode assemblies in the first area. The oxygen-containing gas is connected to oxygen-containing gas inlets for supplying the oxygen-containing gas to the cathodes of the electrolyte electrode assemblies in the first area. Therefore, the sealing structure between the separators and the electrolyte electrode assemblies is greatly simplified, and the number of sealing members required in the fuel cell is reduced.

According to the present invention, the partition may include a ridge protruding from the first plate to contact the second plate, or a ridge protruding form the second plate to contact the first plate. Since the separator itself has the sealing function, differences of heat expansion between the components do not occur, and heat stress is low. With the simple structure, the separator has the reliable sealing function, and the supply of the fuel gas and the oxygen-containing gas are performed suitably.

According to the present invention, the fuel gas and the oxygen-containing gas may be supplied through the fuel gas inlets and the oxygen-containing gas inlets to central regions on opposite surfaces of the electrolyte electrode assemblies, respectively.

The fuel gas and the oxygen-containing gas are supplied to the electrolyte electrode assemblies, and the fuel gas and the oxygen-containing gas flow outwardly from the central regions of the electrolyte electrode assemblies. Thus, the temperature distribution in the electrolyte electrode assemblies is small, and damages to the electrolyte electrode assemblies due to heat stress are prevented. The chemical reaction is uniformly performed on the entire power generation surfaces, and the power generation efficiency is improved.

Further, the flow rate of the fuel gas supplied to the electrolyte electrode assemblies is uniform, and the utilization ratio of the fuel gas is improved. Therefore, the entire surface area of the electrolyte electrode assemblies is utilized efficiently, and the power generation performance is improved.

The fuel gas and the oxygen-containing gas are supplied to the central regions of the electrolyte electrode assemblies, and the fuel gas and the oxygen-containing gas flow radially outwardly from central regions of the electrolyte electrode assemblies. The fuel gas and the oxygen-containing gas used in the reaction are mixed together, and discharged from the electrolyte electrode assemblies as an exhaust gas. Thus, no sealing members are required between the electrolyte electrode assemblies and the separators for separating the fuel gas and the oxygen-containing gas from the exhaust gas. In particular, the sealing structure of the separators and the electrolyte electrode assemblies interposed between the separators is very simple. Therefore, the fuel cell has a simple structure.

According to the present invention, the first plate may have first bosses and the second plate may have second bosses, and the first bosses and the second bosses may protrude toward each other for sandwiching the electrolyte electrode assemblies. The electrolyte electrode assemblies are supported by the first bosses and the second bosses with the minimum contact so as not to disturb the chemical reaction in the electrolyte electrode assemblies.

According to the present invention, the first bosses and the second bosses may function as current collectors for collecting electric energy produced by the chemical reaction of the fuel gas and the oxygen-containing gas supplied to opposite surfaces of the electrolyte electrode assemblies. Therefore, the electric energy generated in each of the fuel cells can be collected reliably.

According to the present invention, the first bosses protrude toward the electrolyte electrode assemblies by a large distance in comparison with the second bosses. The flow rate of the oxygen-containing gas supplied to the cathode is larger than the flow rate of the fuel gas supplied to the anode. Therefore, the size of the first bosses is larger than the second bosses for preventing the pressure loss in the oxygen-containing gas. In particular, when the fuel cell used in combination with the gas turbine, the pressure loss in the compressor for supplying the oxygen-containing gas to the fuel cell stack is reduced.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
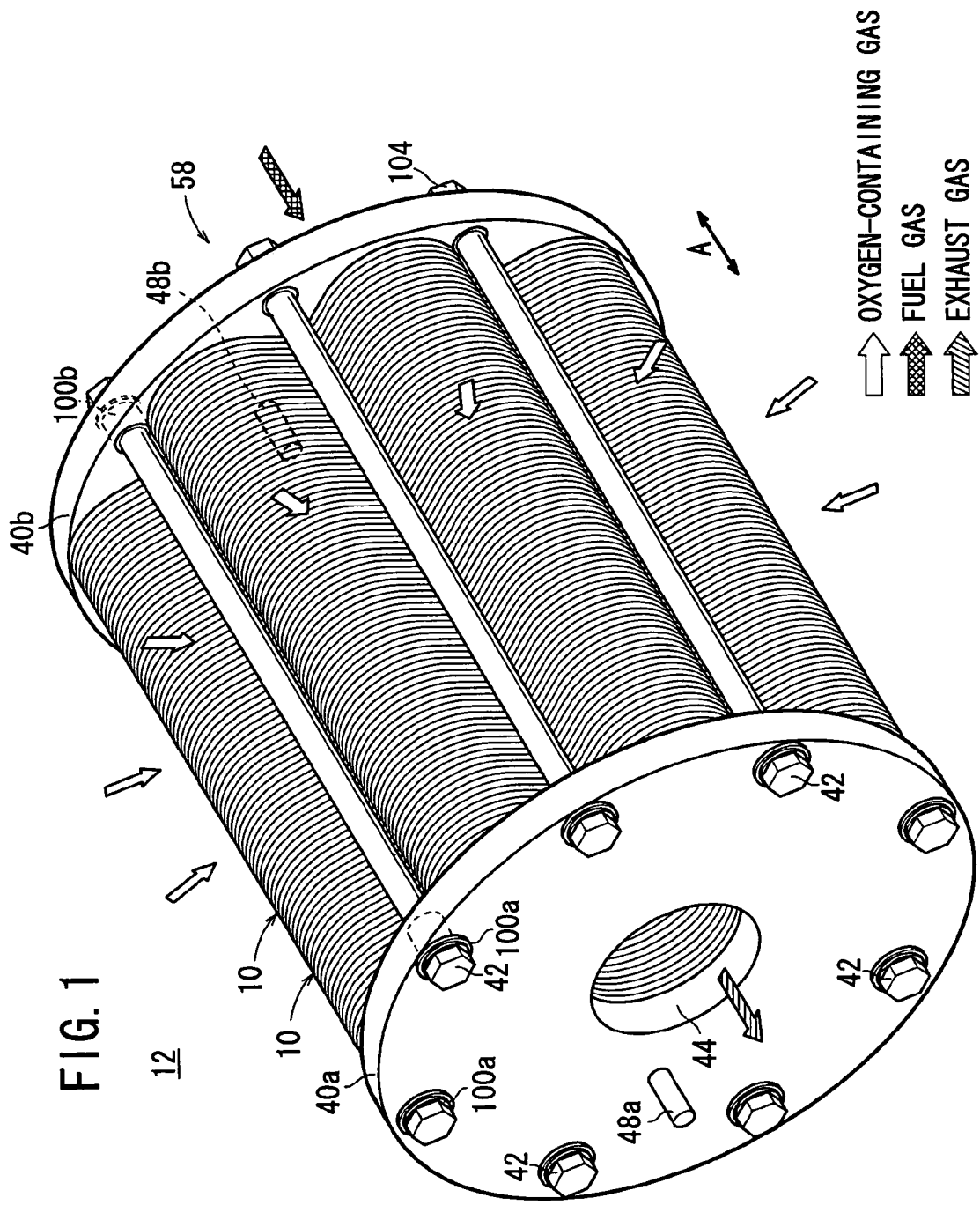
FIG. 1 is a perspective view schematically showing a fuel cell stack formed by stacking a plurality of fuel cells according to an embodiment of the present invention.
Figure 2:
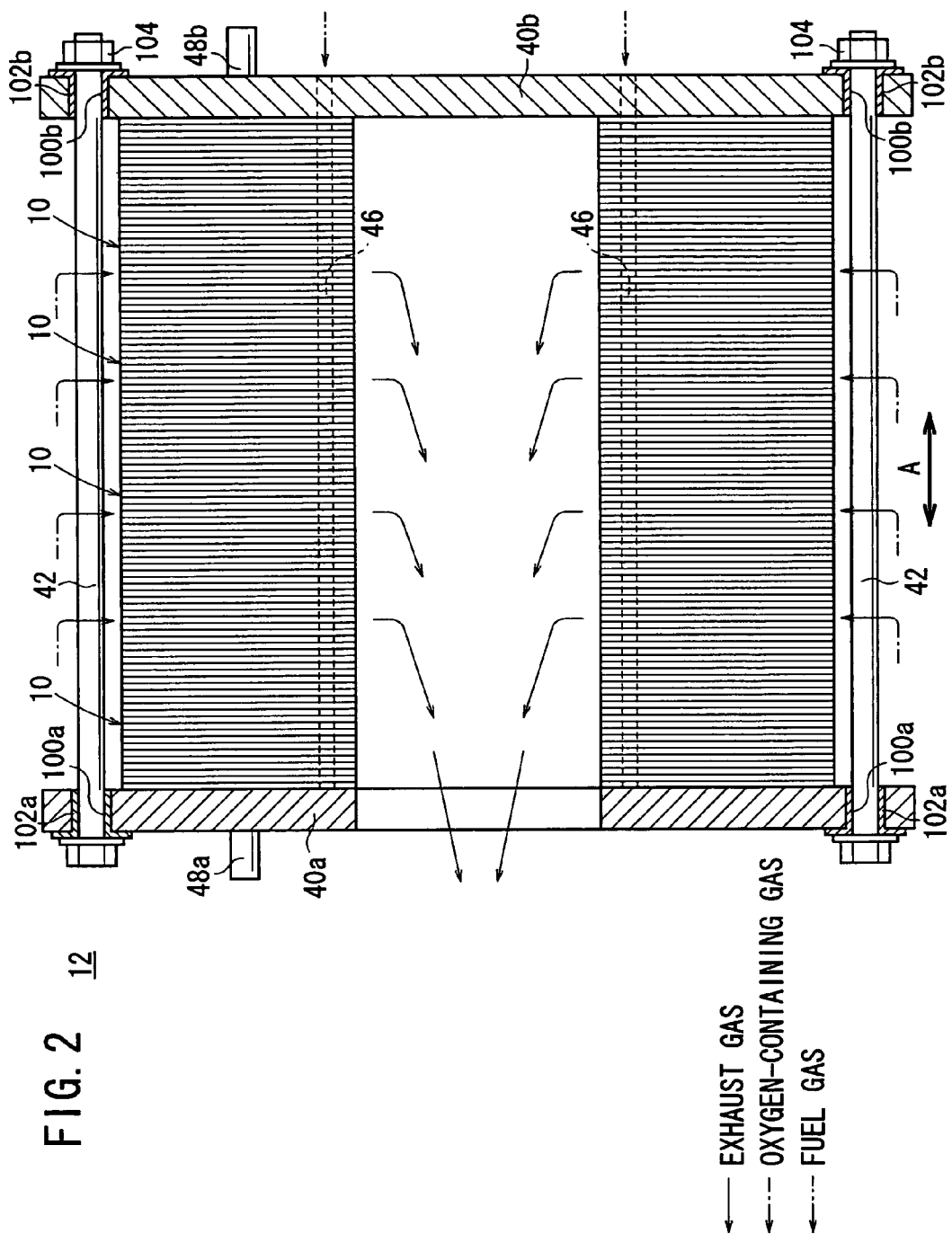
FIG. 2 is a cross sectional view showing a part of the fuel cell stack.

FIG. 1 is a perspective view schematically showing a fuel cell stack 12 formed by stacking a plurality of fuel cells 10 according to an embodiment of the present invention, and FIG. 2 is a cross sectional view showing a part of the fuel cell stack 12.

Figure 3:
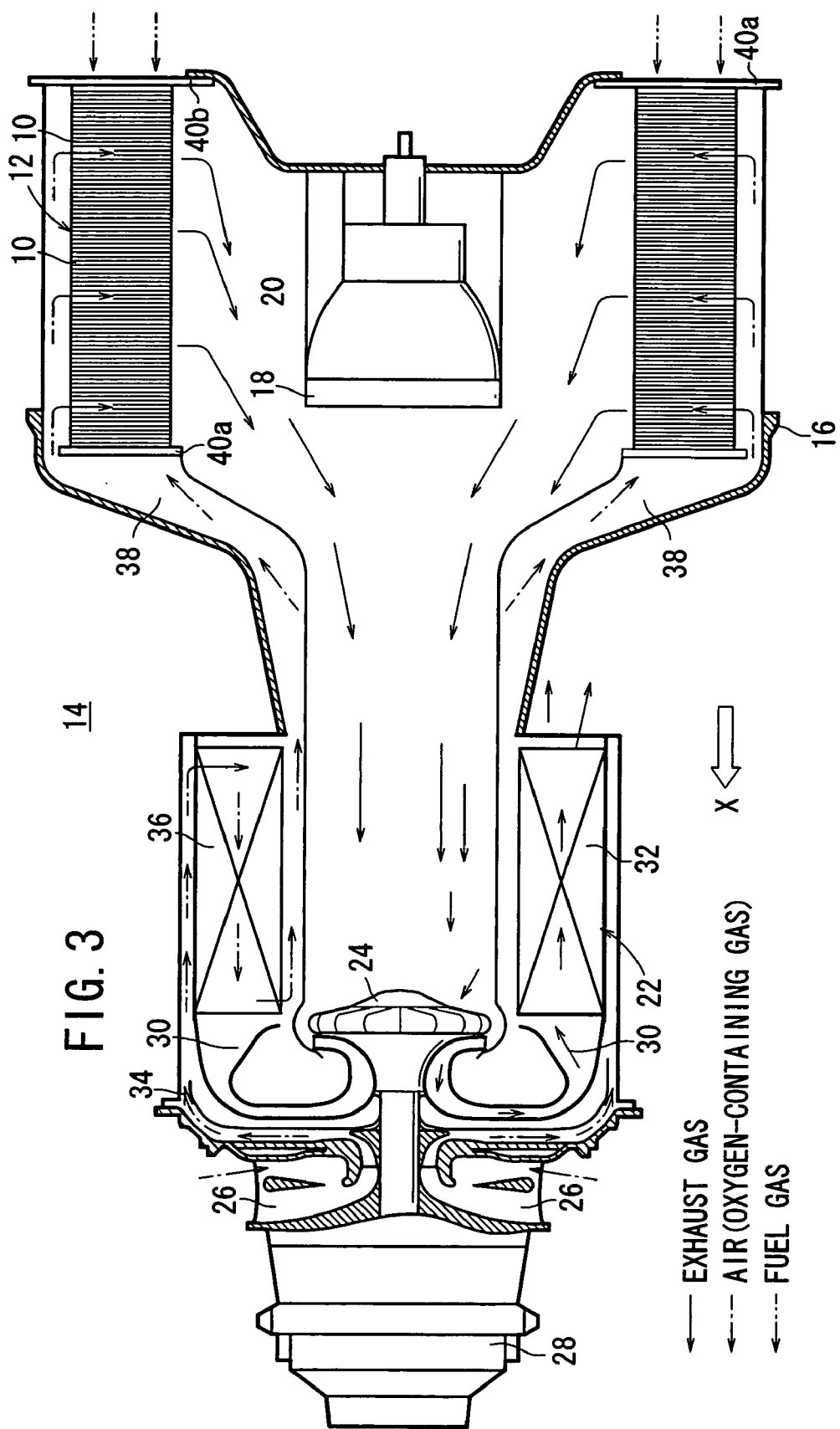
FIG. 3 is a view schematically showing a gas turbine including the fuel cell stack.

The fuel cell 10 is a solid oxide fuel cell (SOFC) for stationary and mobile applications. For example, the fuel cell 10 is mounted on vehicles. In an example of the embodiment shown in FIG. 3, the fuel cell stack 12 is used in a gas turbine 14. In FIG. 3, the shape of the fuel cell stack 12 is different from those shown in FIGS. 1 and 2, however, the structure is substantially the same. The fuel cell stack 12 is disposed in a casing 16 of the gas turbine 14. A combustor 18 is disposed at the center of the fuel cell stack 12. The fuel cell stack 12 discharges an exhaust gas as a mixed gas of a fuel gas and an oxygen-containing gas after reaction into a chamber 20 toward the combustor 18. The chamber 20 is narrowed in a flowing direction of the exhaust gas indicated by an arrow X. A heat exchanger 22 is externally provided around the chamber 20 at a forward end in the flowing direction. Further, a turbine (power turbine) 24 is disposed at the forward end of the chamber 20. A compressor 26 and a power generator 28 are coaxially connected to the turbine 24. The gas turbine 14 has an axially symmetrical structure as a whole.

A discharge passage 30 of the turbine 24 is connected to a first passage 32 of the heat exchanger 22. A supply passage 34 of the compressor 26 is connected to a second passage 36 of the heat exchanger 22. The air is supplied to the outer circumferential surface of the fuel cell stack 12 through a hot air inlet passage 38 connected to the second passage 36.

As shown in FIG. 1, the fuel cell stack 12 is formed by stacking a plurality of fuel cells 10 in a stacking direction indicated by an arrow A. Each of the fuel cells 10 has a shape of a disk having a curved outer section. End plates 40a, 40b are provided outside the outermost fuel cells 10 at opposite ends in the stacking direction, respectively. The fuel cells 10 and the end plates 40a, 40b are tightened together by a plurality of (e.g., eight) tightening bolts 42. At the center of the fuel cell stack 12, a circular hole (discharge manifold) 44 is formed for discharging the exhaust gas from the fuel cell stack 12. The circular hole 44 has a bottom at the end plate 40b, and extends in the direction indicated by the arrow A (see FIG. 2).

A plurality of (e.g., four) fuel gas supply passages 46 are formed along a virtual circle concentric with the circular hole 44. Each of the fuel gas supply passages 46 has a bottom at the end plate 40a, and extend from the end plate 40b in the direction indicated by the arrow A. The end plates 40a, 40b have output terminals 48a, 48b, respectively.

Figure 4:
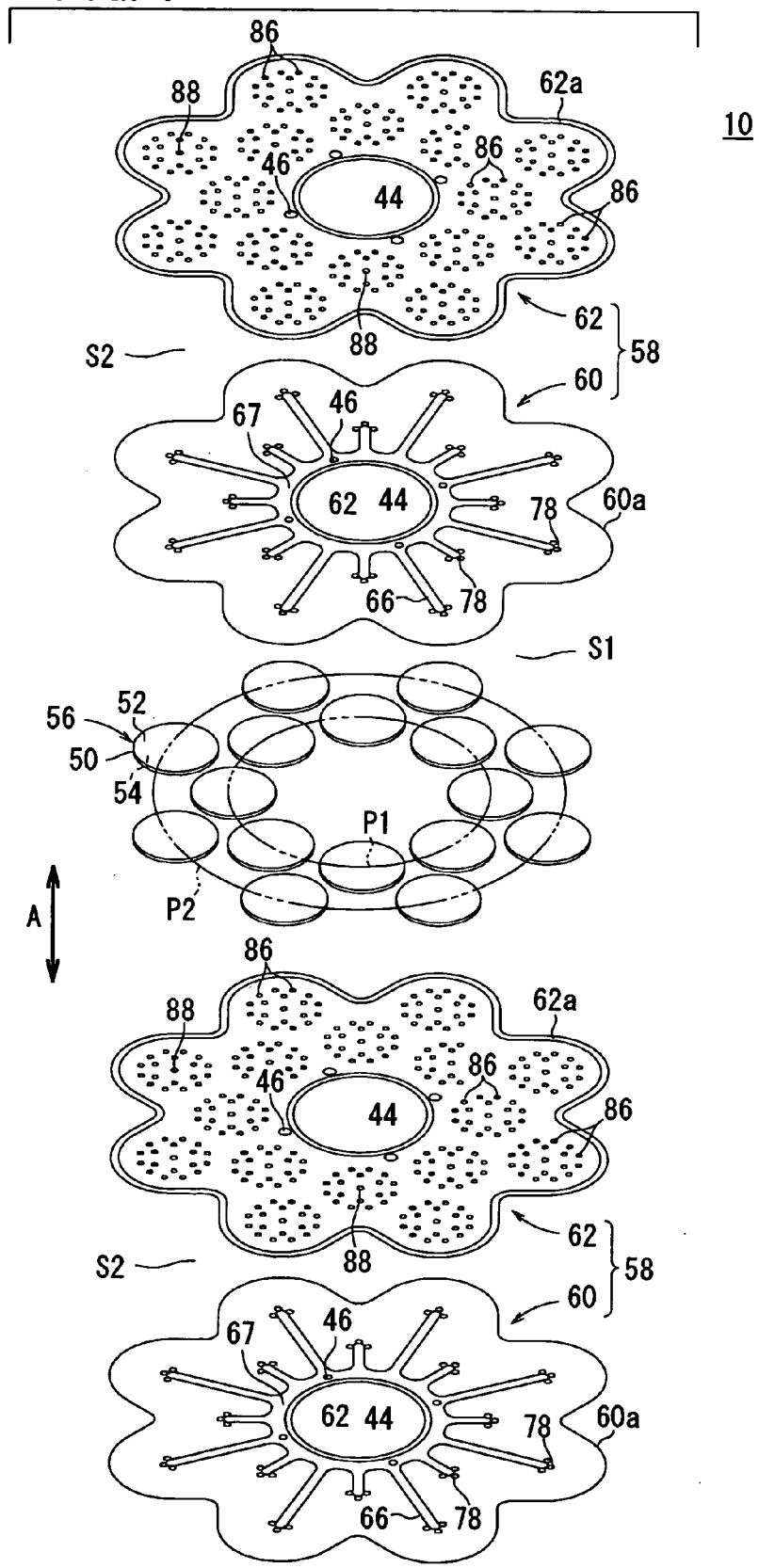
FIG. 4 is an exploded perspective view of the fuel cell.
Figure 5:
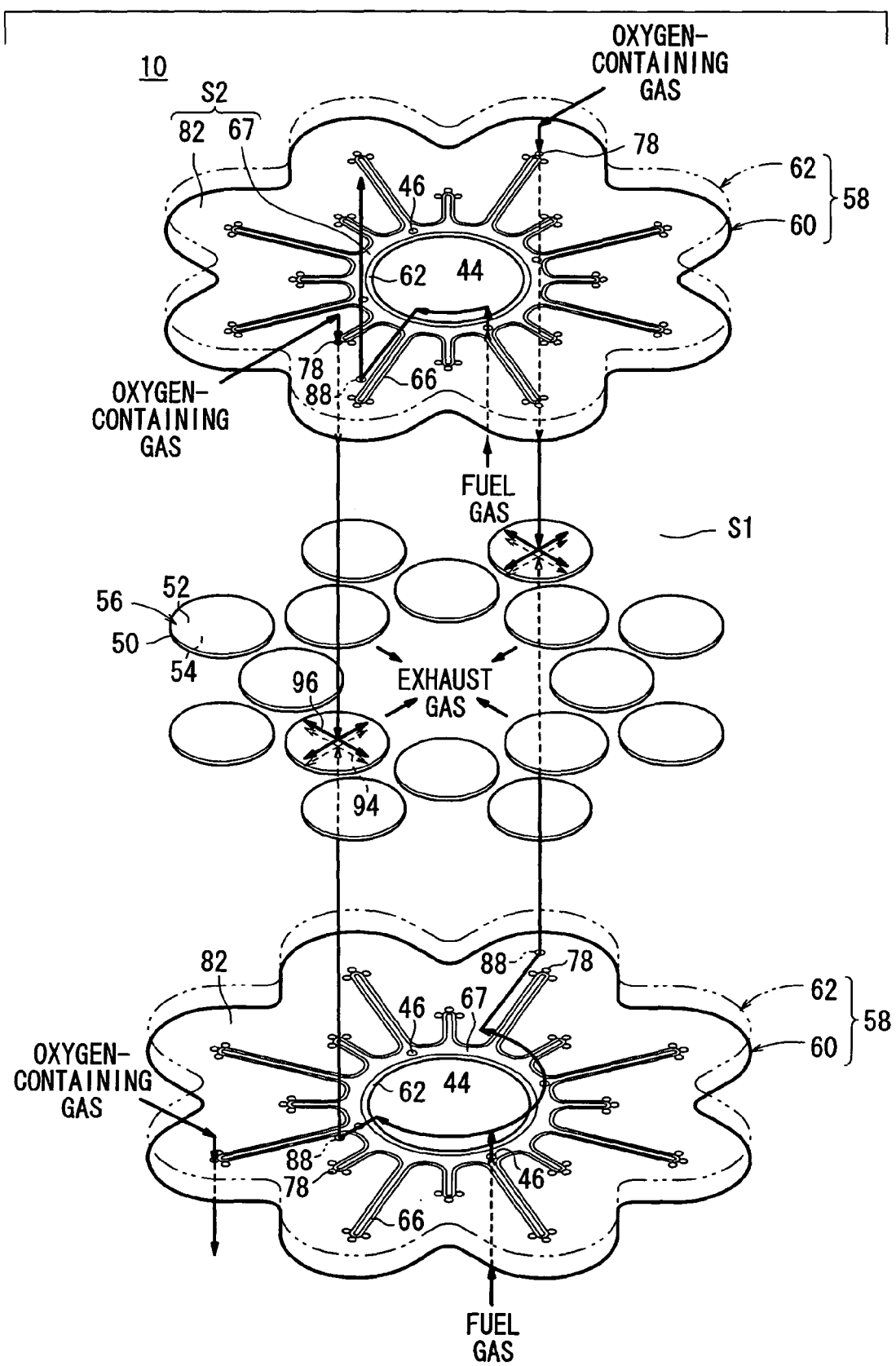
FIG. 5 is a perspective view showing a part of the fuel cell and operation of the fuel cell.

As shown in FIGS. 4 and 5, the fuel cell 10 includes electrolyte electrode assemblies 56. Each of the electrolyte electrode assemblies 56 includes a cathode 52, an anode 54, and an electrolyte (electrolyte plate) 50 interposed between the cathode 52 and the anode 54. The electrolyte 50 is formed of an ion-conductive solid oxide such as stabilized zirconia. The electrolyte electrode assembly 56 has a relatively small circular disk shape.

A plurality of (e.g., 16) the electrolyte electrode assemblies 56 are interposed in a first space S1 between a pair of separators 58 to form the fuel cell 10. The electrolyte electrode assemblies 56 are arranged along an inner circle P1 and an outer circle P2 which are concentric with the circular hole 44 formed at the center of the separators 58. The inner circle P1 passes through centers of eight inner electrolyte electrode assemblies 56, and the outer circle P2 passes through centers of eight outer electrolyte electrode assemblies 56.

Each of the separators 58 includes a plurality of (e.g., two) plates 60, 62 which are stacked together to form a second area S2. Each of the plates 60, 62 is formed of a stainless alloy, for example. Curved sections 60a, 62a are formed on the plates 60, 62, respectively.

Figure 6:
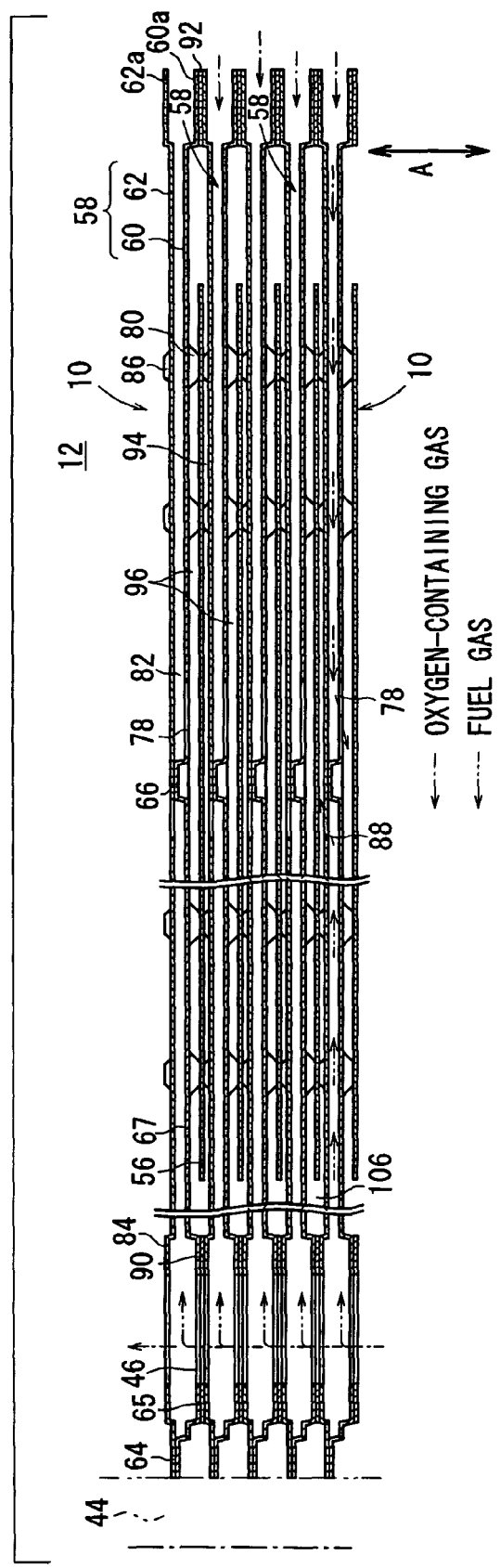
FIG. 6 is a cross sectional view, with partial omissions, showing the fuel cell stack.
Figure 7:
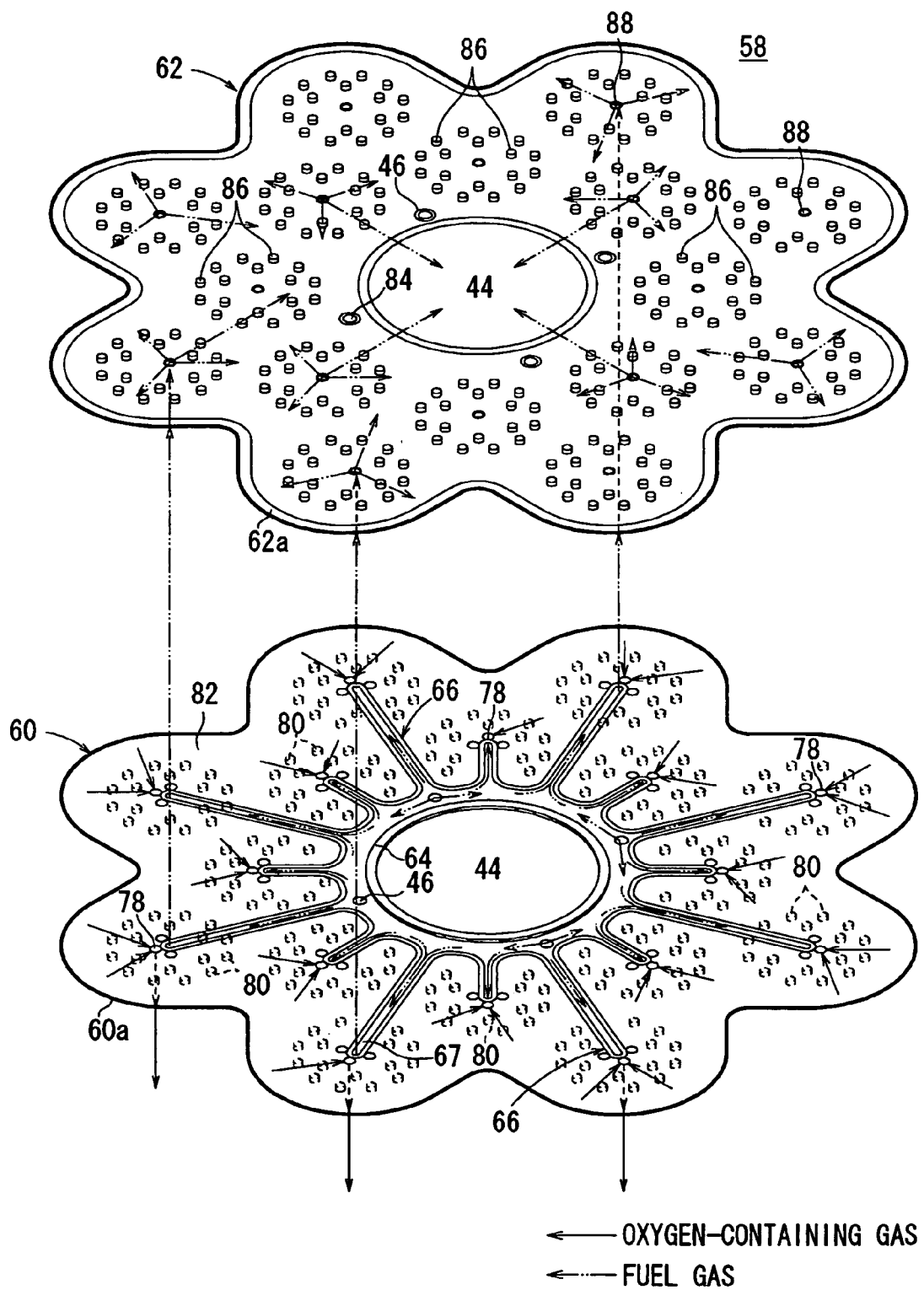
FIG. 7 is an exploded perspective view showing a separator of the fuel cell.
Figure 8:
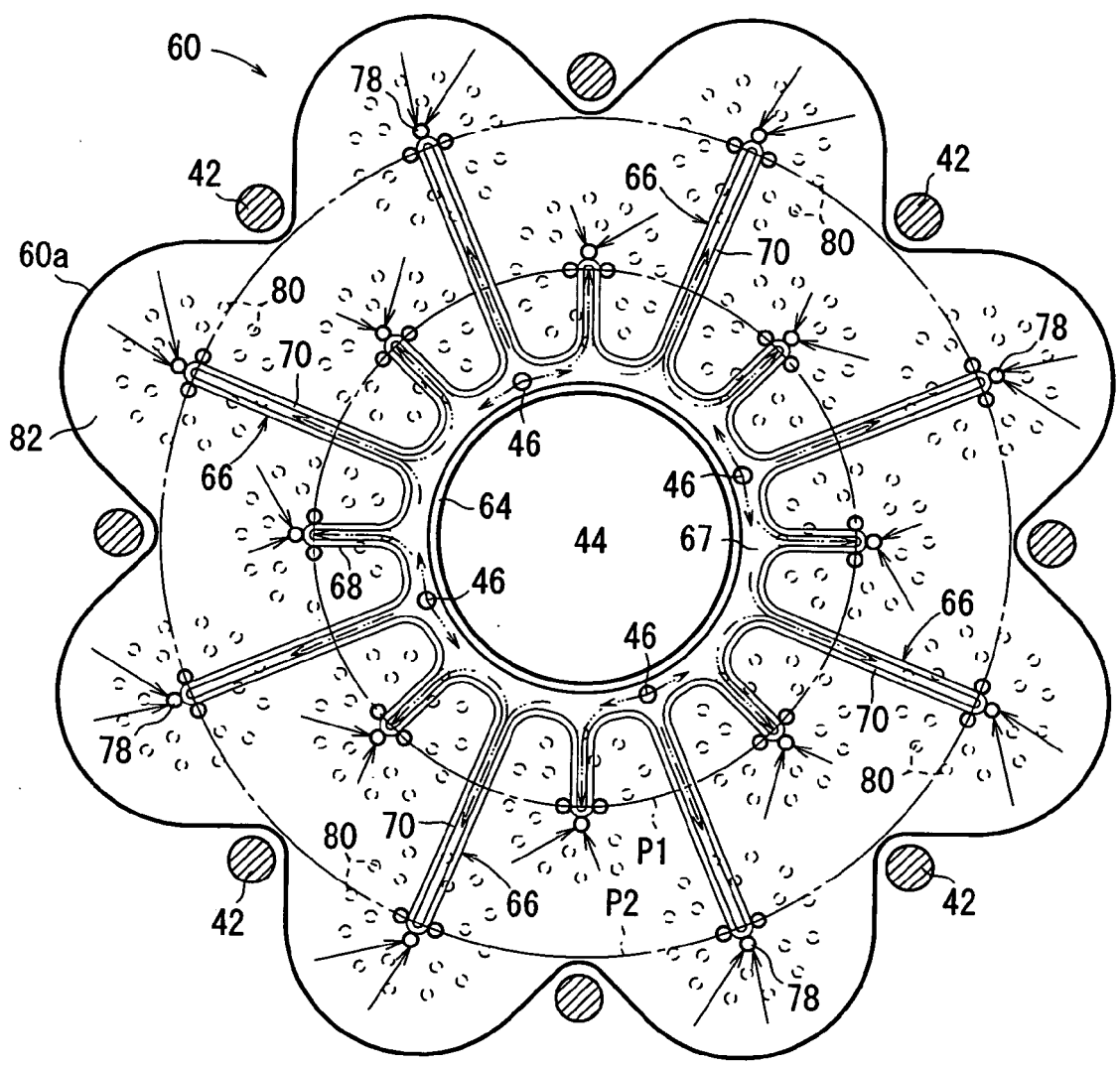
FIG. 8 is a front view showing a plate of the separator.

As shown in FIGS. 6 through 8, the plate 60 has an inner ridge (partition) 64 formed around the circular hole 44. The inner ridge 64 protrudes toward the plate 62. Further, the plate 60 has protrusions 65 around the fuel gas supply passages 46. The protrusions 65 protrude away from the plate 62. Further, the plate 60 has an outer ridge (partition) 66 formed concentrically with the inner ridge 64. A fuel gas channel 67 connected to the fuel gas supply passages 46 is formed between the inner ridge 64 and the outer ridge 66.

The outer ridge 66 includes first walls 68 and second walls 70 each extending radially outwardly by a predetermined distance. The first walls 68 and the second walls 70 are formed alternately. As shown in FIG. 8, each of the first walls 68 extends to the inner circle P1 which is a virtual line passing through centers of the eight inner electrolyte electrode assemblies 56. The first walls 68 are connected to the second walls 70. Each of the second walls 70 extends to the outer circle P2 which is a virtual line passing through the centers of the eight outer electrolyte electrode assemblies 56.

At each end portion of the first walls 68 and at each end portion of the second walls 70, three oxygen-containing gas inlets 78 are formed. The oxygen-containing gas inlets 78 are formed to pass through the surface of the plate 60. A first bosses 80 are formed on the plate 60. The first bosses 80 protrude toward, and contact the electrolyte electrode assemblies 56 arranged in the first area S1 along the first circle P1 and the second circle P2.

The fuel gas channel 67 is formed inside the inner ridge 64 and the outer ridge 66 between the plate 60 and the plate 62. Further, an oxygen-containing gas channel 82 is formed outside the outer ridge 66. The oxygen-containing gas channel 82 is connected to the oxygen-containing gas inlets 78 on the plate 60. The oxygen-containing gas inlets 78 are formed along the inner circle P1 and the outer circle P2. The oxygen-containing gas inlets 78 are formed at positions corresponding to central regions of the cathodes 52 of the electrolyte electrode assemblies 56. Specifically, the oxygen-containing gas is supplied through the oxygen-containing gas inlets 78 to central regions of the cathodes 52 of the electrolyte electrode assemblies 56 in another first area S1 of the adjacent fuel cell 10.

Figure 9:
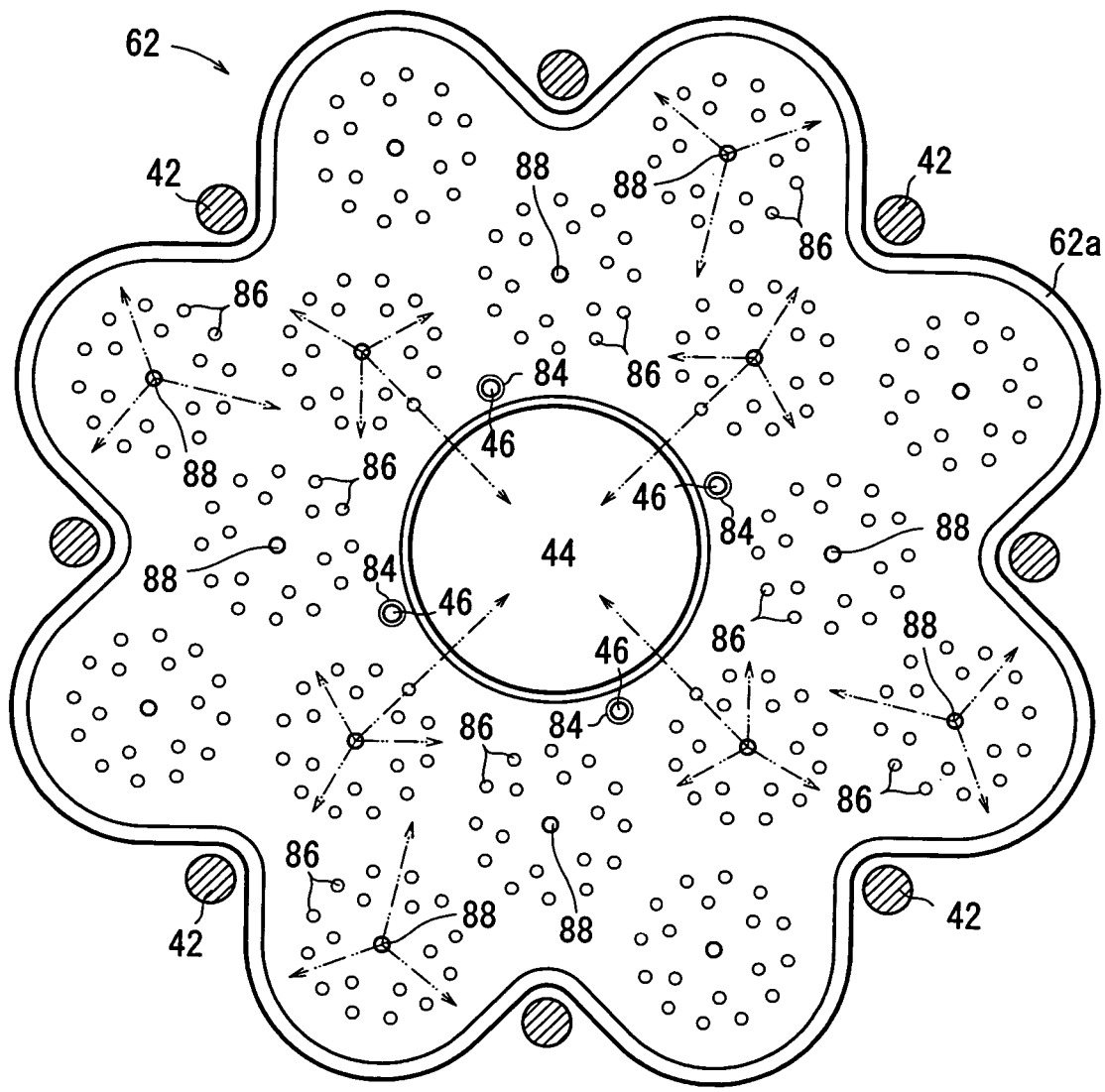
FIG. 9 is a front view showing the other plate of the separator.

As shown in FIGS. 6, 7, and 9, the plate 62 has protrusions 84 around the respective fuel gas supply passages 46. The protrusions 84 protrude away from the plate 60. Further, the plate 62 has second bosses 86 protruding toward, and contact the electrolyte electrode assemblies 56 arranged along the inner circle P1 and the outer circle P2. The second bosses 86 have small dimensions (height and diameter) in comparison with the first bosses 80.

Fuel gas inlets 88 are formed to pass through the plate 62 to the inside of the end portions of the first wall 68 and the second wall 70, respectively. As with the oxygen-containing gas inlets 78, the fuel gas inlets 88 are formed along the inner circle P1 and the outer circle P2. The fuel gas inlets 88 are formed at positions corresponding to central regions of the anodes 54 of the electrolyte electrode assemblies 56.

The separator 58 has insulator seals 90 for sealing the fuel gas supply passages 46 (see FIG. 6). For example, the insulator seal 90 is formed by placing a ceramics plate on the plate 60 or the plate 62 or forming the insulator seal 90 on the plate 60 or the plate 62 by thermal spraying. The curved outer sections 60a, 62a protrude away from each other. An insulator seal 92 is provided on the curved outer section 60a or the curved outer section 62a by inserting the insulator seal 92 between the curved outer section 60a and the curved outer section 62a. Alternatively, the insulator seal 92 of ceramics or the like is formed on the curved outer section 60a or the curved outer section 62a by thermal spraying.

As shown in FIGS. 5 and 6, the electrolyte electrode assemblies 56 are interposed between the plate 60 of one separator 58 and the plate 62 of the other separator 58. Specifically, the plate 60 and the plate 62 outside the electrolyte electrode assemblies 56 has the first bosses 80 and the second bosses 86 protruding toward the electrolyte electrode assemblies 56 for sandwiching the electrolyte electrode assemblies 56.

Figure 10:
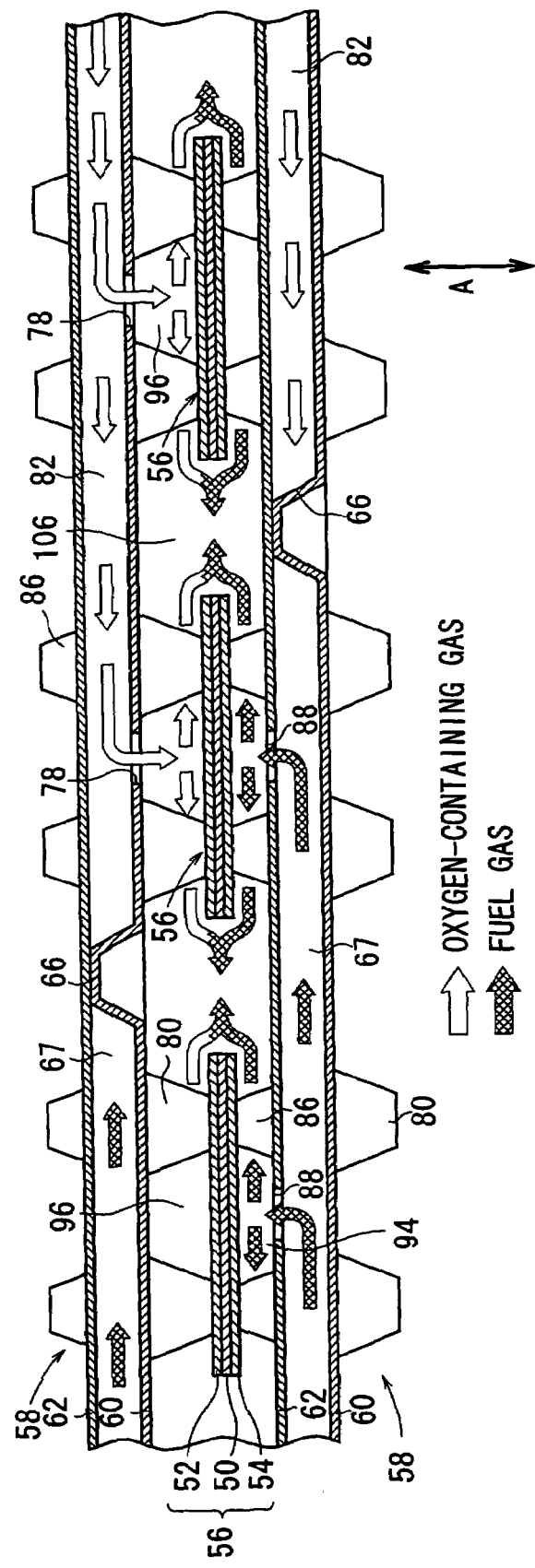
FIG. 10 is a view showing operation of the fuel cell.
Figure 11:
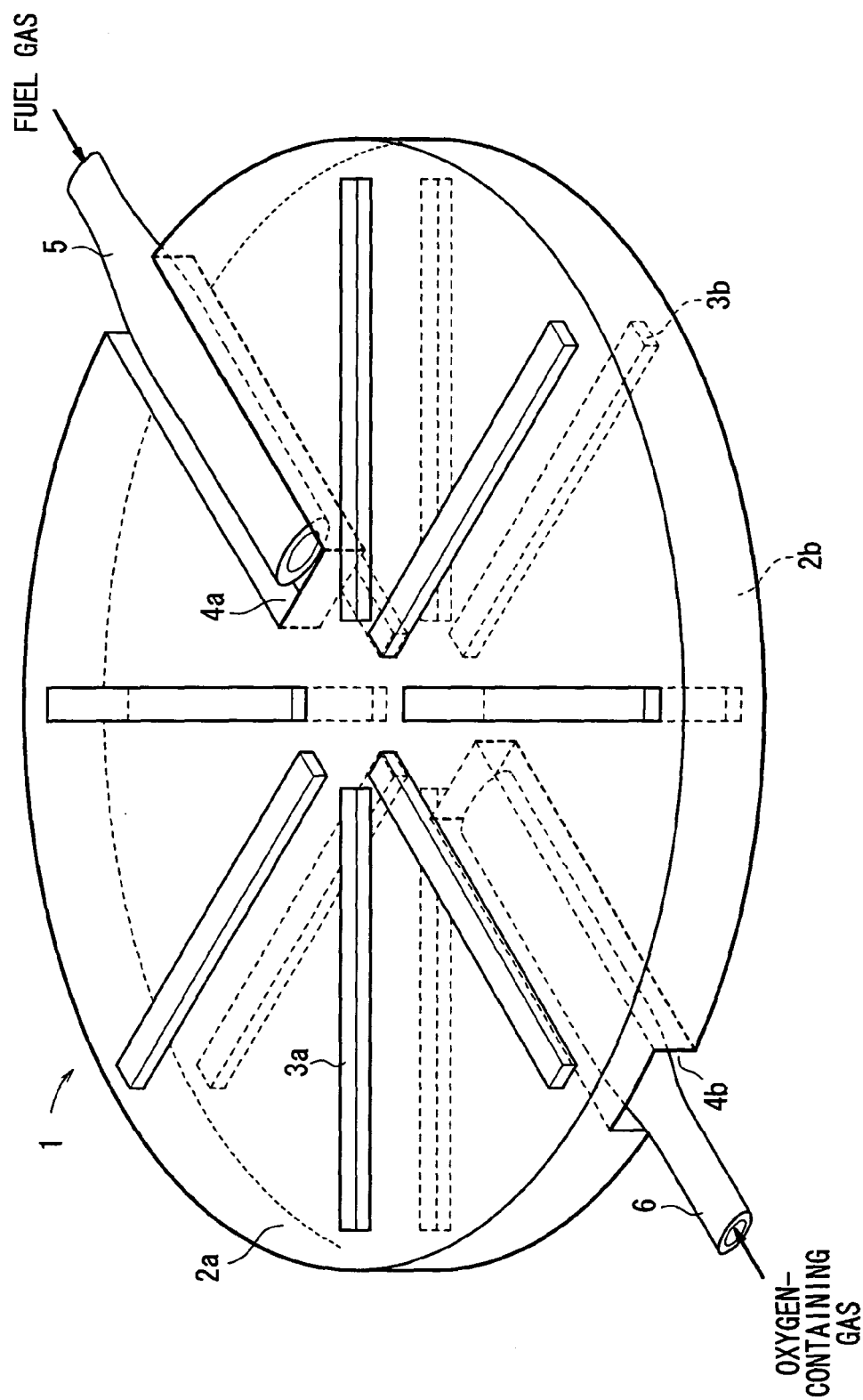
FIG. 11 is a perspective view showing a conventional fuel cell.

As shown in FIG. 10, a fuel gas flow passage 94 connected to the fuel gas channel 67 through the fuel gas inlets 88 is formed between the electrolyte electrode assemblies 56 and the plate 62 of the separator 58. Further, an oxygen-containing gas flow passage 96 connected to the oxygen-containing gas channel 82 through the oxygen-containing gas inlets 78 is formed between the electrolyte electrode assemblies 56 and the plate 60 of the other separator 58 on the opposite side. The size of the opening of the fuel gas flow passage 94 depends on the height of the second bosses 86. The size of the opening of the oxygen-containing gas flow passage 96 depends on the height of the first bosses 80. The flow rate of the oxygen-containing gas is larger than the flow rate of the fuel gas. Therefore, the dimensions of the first bosses 80 are smaller than the dimensions of the second bosses 86.

As shown in FIG. 6, the fuel gas channel 67 formed between the plates 60, 62 of the separator 58 is connected to the fuel gas supply passages 46. The oxygen-containing gas channel 82 and the fuel gas channel 67 are formed on the same area inside the separator 58. The oxygen-containing gas channel 82 is open to the outside through the spacing between the curved outer sections 60*a*, 62*a* of the plates 60, 62 of the separator 58.

Each of the separators 58 stacked in the stacking direction has the first bosses 80 and the second bosses 86 for sandwiching the electrolyte electrode assemblies 56. The first bosses 80 and the second bosses 86 function as current collectors. The outer ridge 66 of the plate 60 is in contact with the plate 62 for serially connecting the fuel cells 10 in the direction indicated by the arrow A.

As shown in FIGS. 1 and 2, the fuel cells 10 are stacked in the direction indicated by the arrow A. End plates 40*a*, 40*b* are disposed outside the outermost fuel cells 10 at opposite ends. The end plates 40*a*, 40*b* has holes 100*a*, 100*b* at positions corresponding to the inward curves of the curved outer sections 60*a*, 62*a* of the plates 60, 62. Insulator members 102*a*, 102*b* are attached in the holes 100*a*, 100*b*. The tightening bolts 42 are inserted in the insulator members 102*a*, 102*b*. Ends of the tightening bolts 42 are screwed into nuts 104 for tightening the fuel cells 10 together with a suitable force.

Next, operation of the fuel cell stack 12 will be described below.

In assembling the fuel cell 10, the plate 60 and the plate 62 are connected together to form the separator 58. Specifically, as shown in FIG. 6, the outer ridge 66 extending integrally from the plate 60 is connected to the plate 62 by brazing, and the ring-shaped insulator seals 90 are provided on the plate 60 or the plate 62 around the fuel gas supply passages 46 by thermal spraying, for example. Further, the insulator seal 92 having curves is provided on the curved outer section 60*a* of the plate 60 or the curved outer section 62*a* of the plate 62 by thermal spraying, for example.

The separator 58 thus formed has the fuel gas channel 67 and the oxygen-containing gas channel 82 on the same area between the plate 60 and the plate 62. The fuel gas channel 67 is connected to the fuel gas supply passages 46, and the oxygen-containing gas channel 82 between the curved outer section 60*a* and the curved outer section 62*a* is open to the outside.

Then, the electrolyte electrode assemblies 56 are interposed between a pair of separators 58. As shown in FIGS. 4 and 5, sixteen electrolyte electrode assemblies 56 are interposed between the plate 60 of one separator 58 and the plate 62 of the other separator 58. Eight electrolyte electrode assemblies 56 are arranged along the inner circle P1, and eight electrolyte electrode assemblies 56 are arranged along the outer circle P2. The first bosses 80 of the plate 60 and the second bosses 86 of the plate 62 protrude toward, and contact the electrolyte electrode assemblies 56.

As shown in FIG. 10, the oxygen-containing gas flow passage 96 is formed between the cathodes 52 of the electrolyte electrode assemblies 56 and the plate 60. The oxygen-containing gas flow passage 96 is connected to the oxygen-containing gas channel 82 through the oxygen-containing gas inlets 78. The fuel gas flow passage 94 is formed between the anodes 54 of the electrolyte electrode assemblies 56 and the plate 62. The fuel gas flow passage 94 is connected to the fuel gas channel 67 through the fuel gas inlets 88. An exhaust gas passage 106 is formed between the separators 58 for guiding the exhaust gas (mixed gas of the fuel gas and the oxygen-containing gas after reaction) to the circular hole 44.

A plurality of the fuel cells 10 as assembled above are stacked in the direction indicated by the arrow A to form the fuel cell stack 12 (see FIGS. 1 and 2).

The fuel gas such as a hydrogen containing gas is supplied to the fuel gas supply passages 46 of the end plate 40*b*, and the oxygen-containing gas such as air is supplied from the outside of the fuel cells 10 under pressure. The fuel gas supplied to the fuel gas supply passages 46 flows in the stacking direction indicated by the arrow A, and is supplied to the fuel gas channel 67 formed in each of the separators 58 of the fuel cells 10 (see FIG. 6).

As shown in FIG. 5, the fuel gas flows along the first walls 68 and the second walls 70 of the outer ridge 66, and flows into the fuel gas flow passage 94. The fuel gas inlets 88 are formed at end portions of the first walls 68 and the second walls 70, i.e., at positions corresponding to central regions of the anodes 54 of the electrolyte electrode assemblies 56. The fuel gas supplied to the fuel gas flow passage 94 flows outwardly from the central regions of the anodes 54 (see FIG. 10).

The oxygen-containing gas is supplied to each of the fuel cells 10 from the outside. The oxygen-containing gas is supplied to the oxygen-containing gas channel 82 formed in each of the separators 58, between the plate 60 and the plate 62. The oxygen-containing gas supplied to the oxygen-containing gas channel 82 flows into the oxygen-containing gas flow passage 96 through the oxygen-containing gas inlets 78, and flows outwardly from central regions of the cathodes 52 of the electrolyte electrode assemblies 56 (see FIGS. 5 and 10).

Therefore, in each of the electrolyte electrode assemblies 56, the fuel gas is supplied to the central region of the anode 54, and flows outwardly from the central region of the anode 54. Similarly, the oxygen-containing gas is supplied to the central region of the cathode 52, and flows outwardly from the central region of the cathode 52. The oxygen-ion passes from the cathode 52 to the anode 54 through the electrolyte 50 to generate electricity by electrochemical reactions.

In the present embodiment, the electrolyte electrode assemblies 56 are sandwiched between the first bosses 80 and the second bosses 86. Therefore, the first bosses 80 and the second bosses 86 function as current collectors. The fuel cells 10 are electrically connected in series in the stacking direction indicated by the arrow A. The electricity can be outputted form the output terminals 48*a*, 48*b*.

The electrolyte electrode assemblies 56 are supported by the first bosses 80 and the second bosses with 86 the minimum contact so as not to disturb the chemical reaction in the electrolyte electrode assemblies 56.

The first bosses 80 toward the electrolyte electrode assemblies 56 protrude by a large distance in comparison with the second bosses 86 (see FIG. 10). The flow rate of the oxygen-containing gas supplied to the oxygen-containing gas flow passage 96 is larger than the flow rate of the fuel gas supplied to the fuel gas flow passage 94. Therefore, the size of the first bosses 80 is larger than the second bosses 86 for preventing the pressure loss in the oxygen-containing gas even if the flow rate of the oxygen-containing gas supplied to the oxygen-containing gas flow passage 96 is increased. In particular, when the fuel cell 10 is used in combination with the gas turbine 14, the pressure loss is effectively reduced.

After reaction of the fuel gas and the oxygen-containing gas, the exhaust gas moves outwardly from the central regions of the electrolyte electrode assemblies 56 through the exhaust passage 106 between the separators 58, and flows toward the center of the separators 58. The exhaust gas flows into the circular hole 44 formed at the center of separators 58, and is discharged from the circular hole 44 to the outside. The separators 58 form the manifold for supplying the fuel gas and the oxygen-containing gas, and the manifold for discharging the fuel gas and the oxygen-containing gas. Thus, the fuel cell stack 12 has a simple structure without the need of special components. The exhaust gas is guided to the circular hole 44 at the center of the separators 58. Therefore, the turbulence of the exhaust gas discharged from the electrolyte electrode assemblies 56 does not occur, and the flow rate of the exhaust gas is kept constant.

In the present embodiment, each of the separators 58 includes the plates 60, 62 to form a second area S2 between the plates 60, 62. The second area S2 is divided by the outer ridge 66 as a partition into the fuel gas channel 67, and the oxygen-containing gas channel 82.

In the separator, the fuel gas channel 67 and the oxygen-containing gas channel 82 are sealed by the outer ridge 66. Thus, no special sealing members are required. The fuel cell has a simple sealing structure, and the overall dimension of the fuel cell 10 in the stacking direction is small.

The outer ridge 66 protrudes integrally from the plate 60. Thus, the separator 58 itself has the sealing function, differences of heat expansion between the components do not occur, and heat stress is low. Wit the simple structure, the separator 58 has the reliable sealing function, and the supply of the fuel gas and the oxygen-containing gas are performed suitably.

The fuel gas channel 67 is connected to the fuel gas inlets 88 for supplying the fuel gas to the electrolyte electrode assemblies 56 in the first area S1. Further, the oxygen-containing gas channel 82 is connected to the oxygen-containing gas supply inlets 78 for supplying the oxygen-containing gas to the electrolyte electrode assemblies 56 in another first area S1. Thus, the number of the sealing members which are additionally required in the conventional supply pipes is reduced. Therefore, the sealing structure between the separators and the electrolyte electrode assemblies is greatly simplified. The overall dimension of the fuel cell 10 in the stacking direction is small.

Further, in the present embodiment, the fuel gas flows from the fuel gas channel 67 into the fuel gas inlets 88 and the oxygen-containing gas flows from the oxygen-containing gas channel 82 into the oxygen-containing gas inlets 78. The fuel gas inlets 88 and the oxygen-containing gas inlets 78 are positioned at central regions on opposite surfaces of the electrolyte electrode assemblies 56 (see FIG. 10). The fuel gas and the oxygen-containing gas flow outwardly from the central regions of the electrolyte electrode assemblies 56. Therefore, the temperature distribution in the respective electrolyte electrode assemblies 56 is small, and damages due to heat stress are prevented. The chemical reaction is performed uniformly on the entire power generation surfaces.

In the structure, the flow rate of the fuel gas supplied to each of the electrolyte electrode assemblies 56 is uniform. The utilization ratio of the fuel gas in the electrolyte electrode assemblies 56 is improved, and the entire surfaces of the electrolyte electrode assemblies 56 are utilized efficiently. Thus, the power generation performance is improved greatly.

The fuel gas and the oxygen-containing gas are supplied to the central regions on the opposite surfaces of the electrolyte electrode assemblies 56. The fuel gas and the oxygen-containing gas flow from the central regions on the opposite surfaces of the electrolyte electrode assemblies 56 radially outwardly. Thus, no sealing structure for the fuel gas and the oxygen-containing gas is required between the electrolyte electrode assemblies 56 and the separators 58, and the fuel cell 10 has a simple structure.

Next, the operation of the fuel cell stack 12 used in the gas turbine 14 shown in FIG. 3 will be described briefly.

As shown in FIG. 3, in starting the operation of the gas turbine 14, the combustor 18 is energized to spin the turbine 24, and energize the compressor 26 and the power generator 28. The compressor 26 functions to guide the external air into the supply passage 34. The air is pressurized and heated to a predetermined temperature (e.g., 200° C.), and supplied to the second passage 36 of the heat exchanger 22.

A hot exhaust gas as a mixed gas of the fuel gas and the oxygen-containing gas after reaction is supplied to the first passage 32 of the heat exchanger 22 for heating the air supplied to the second passage 36 of the heat exchanger 22. The heated air flows through the hot air supply passage 38, and supplied to the fuel cells 10 of the fuel cell stack 12 from the outside. Thus, the power generation is performed by the fuel cells 10, and the exhaust gas generated by the reaction of the fuel gas and the oxygen-containing gas is discharged into the chamber 20 in the casing 16.

At this time, the temperature of the exhaust gas discharged from the fuel cells (solid oxide fuel cells) 10 is high, in the range of 800° C. to 1000° C. The exhaust gas spins the turbine 24 for generating electricity by the power generator 28. The exhaust air is supplied to the heat exchanger 22 for heating the external air. Therefore, it is not necessary to use the combustor 18 for spinning the turbine 24.

The hot exhaust gas in the range of 800° C. to 1000° C. can be used for internally reforming a fuel supplied to the fuel cell stack 12. Therefore, various fuels such as natural gas, butane, and gasoline can be used for the internal reforming.

In the present embodiment, the fuel cell stack 12 is used in the gas turbine 14. However, the fuel cell stack 12 can be used in other applications. For example, the fuel cell stack 12 can be mounted on vehicles.

According to the present invention, a first area for providing electrolyte electrode assemblies is formed between a pair of separators. Each of the separators includes a first plate and a second plate stacked together to form a second area between the first plate and the second plate. The second area is divided by a partition into a fuel gas channel for supplying a fuel gas to anodes of the electrolyte electrode assemblies, and oxygen-containing gas channel for supplying an oxygen-containing gas to cathodes of the electrolyte electrode assemblies.

In the separator, the fuel gas channel and the oxygen-containing gas channel are sealed by the partition. Thus, no special sealing members are required. The separator is simple and light. The dimension of the fuel cell in the stacking direction is small.

The fuel gas channel formed in one of said separators (is connected to a fuel gas flow passage in the first area through fuel gas inlets for supplying a fuel gas to the electrolyte electrode assemblies. The oxygen-containing gas channel formed in the other of the separators is connected to an oxygen-containing gas flow passage in the first area through oxygen-containing gas inlets for supplying an oxygen-containing gas to the electrolyte electrode assemblies. Thus, the sealing structure between the separators and the electrolyte electrode assemblies is greatly simplified, and the number of sealing members required in the fuel cell is reduced. Thus, the fuel cell has a simple structure.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell comprising a pair of separators and electrolyte electrode assemblies interposed between said separators, said electrolyte electrode assemblies each including an anode, a cathode, and an electrolyte interposed between said anode and said cathode, wherein
   a first area for providing said electrolyte electrode assemblies is formed between said separators;
   each of said separators includes a first plate and a second plate stacked together to form a second area between said first plate and said second plate;
   fuel gas channel, and an oxygen-containing gas channel are formed between the first plate and the second plate in the second area, the fuel gas channel and the oxygen-containing gas channel are separated by a partition, said partition including a ridge protruding from said first plate to contact said second plate;
   said fuel gas channel formed in one of said separators is connected to said first area through fuel gas inlets for supplying said fuel gas to anodes of said electrolyte electrode assemblies; and
   said oxygen-containing gas channel formed in the other of said separators is connected to said first area through oxygen-containing gas inlets for supplying said oxygen-containing gas to cathodes of said electrolyte electrode assemblies.

2. A fuel cell according to claim 1, said fuel gas and said oxygen-containing gas are supplied trough said fuel gas inlets and said oxygen-containing gas inlets to central regions on opposite surfaces of said electrolyte electrode assemblies, respectively.

3. A fuel cell according to claim 1, wherein said first plate and said second plate have lint bosses and second bosses, respectively, and said first bosses and said second bosses protrude toward each other for sandwiching said electrolyte electrode assemblies.

4. A fuel cell according to claim 3, wherein said first bosses and said second bosses are current collectors for collecting electric energy produced by chemical reaction of said fuel gas and said oxygen-containing gas supplied to opposite surfaces of electrolyte electrode assemblies.

5. A fuel cell according to claim 3, wherein said first bosses protrude toward said electrolyte electrode assemblies by a large distance in comparison with said second bosses.

6. A fuel cell according to claim 1, said fuel gas and said oxygen-containing gas are supplied through said fuel gas inlets and said oxygen-containing gas inlets to central regions on opposite surfaces of said electrolyte electrode assemblies, respectively.

7. A fuel cell according to claim 1, wherein said first plate and said second plate have first basses and second bosses, respectively, and said first bosses and said second bosses protrude toward each other for sandwiching said electrolyte electrode assemblies.

8. A fuel cell according to claim 7, wherein said first bosses and said second bosses are current collectors for collecting electric energy produced by chemical reaction of said fuel gas and said oxygen-containing gas supplied to opposite surfaces of electrolyte electrode assemblies.

9. A fuel call according to claim 7, wherein said first bosses protrude toward said electrolyte electrode assemblies by a large distance In comparison with said second bosses.

* * * * *